March 9, 1954     H. F. A. SCHMADEKE     2,671,626
HOSE REINFORCING DEVICE
Filed March 10, 1952

HOWARD F. A. SCHMADEKE
INVENTOR.

BY
James D. Givnan
ATT'Y

Patented Mar. 9, 1954

2,671,626

UNITED STATES PATENT OFFICE 2,671,626

HOSE REINFORCING DEVICE

Howard F. A. Schmadeke, Portland, Oreg.

Application March 10, 1952, Serial No. 275,787

1 Claim. (Cl. 248—75)

This invention relates to new and useful improvements in supports or holders for hoses of various kinds and particularly for the type of drainage hose made of plastic or other molded material and used in connection with washing machines and wherein the discharge end of the hose is formed into a goose-neck or hook-shaped end for placement upon, or attachment to, the rim of a laundry tub or other drainage receptacle.

The hook-shaped end portion of all of such types of hoses is subject to the straightening influence of the discharge water passing through the hose and particularly if the water is heated. As the end of the hose straightens it obviously becomes disengaged from its point of attachment and must be subsequently reformed or rebent to accomplish its intended result.

Accordingly, it is one of the principal objects of my invention to provide simple, efficient, durable, and inexpensive reinforcing means in the form of an inverted U-shaped frame adapted for convenient application to the hook-shaped end of the hose so that it will retain its shape and be prevented from straightening as aforesaid.

These and other objects will appear as my invention is more fully hereinafter described in the following specification, illustrated in the accompanying drawing, and finally pointed out in the appended claim.

Figure 1:
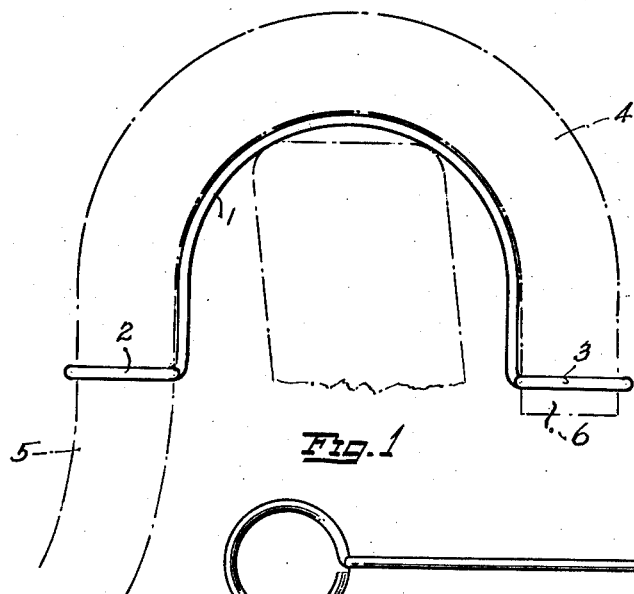
Figure 1 is a side elevation of a hose reinforcing means made in accordance with my invention and shown slidably engaged with a hose shown in broken lines.
Figure 2:
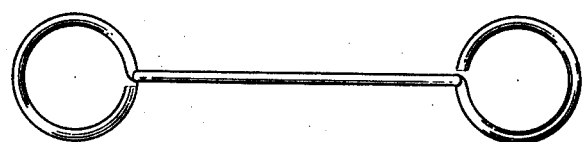
Figure 2 is a top plan view of Figure 1.

Referring now more particularly to the drawing:

The embodiment of the invention illustrated in Figures 1 and 2 comprises an arched or inverted U-shaped supporting frame 1 preferably made of wire and whose end portions are looped back on themselves to provide hose-gripping rings 2 and 3. The rings are adapted to embrace the hook-shaped end portion 4 of a hose 5.

In attaching the frame 1 to the hook-shaped end of the hose the ring 2 is first slipped over the discharge end 6 of the hose and moved therearound until it reaches the approximate position shown in Figure 1 which will cause the ring 3 to assume the position also shown in Figure 1. Said rings 2 and 3 secure the end portion of the hose in its hook-shaped formation and prevent its straightening under the influence of the water pressure exhausting from the hose particularly if the water is of a temperature sufficient to soften the molded or plastic material of the hose.

Figure 3:
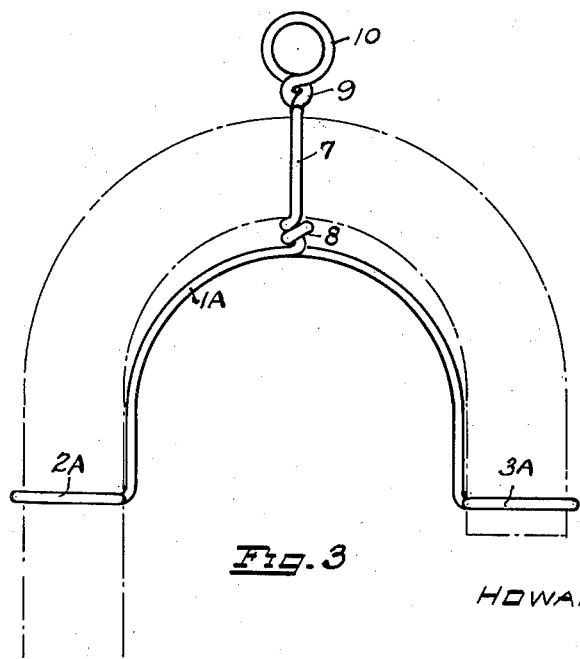
Figure 3 is a side elevation of a modified form of the invention.
Figure 4:
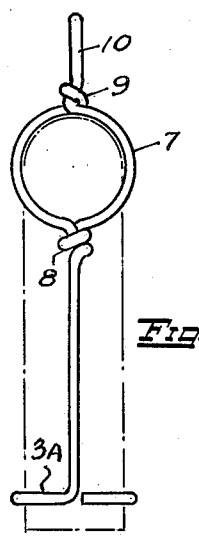
Figure 4 is an end view of Figure 3.

In the modified form of the invention illustrated in Figures 3 and 4 the arch frame 1A terminates in hose-gripping rings 2A and 3A as in the other form of the invention but the wire from which the frame is made is of sufficient length to permit the formation of a hose-gripping ring 7 formed intermediate the ends of the frame 1A by twisting the wire around itself as at 8 below the ring 7 and above the ring 7 as at 9 to provide a ring 10 by means of which the frame 1A and the hose attached to it may be suspended from any suitable support attached to a wall or other structure.

While I have shown particular forms of embodiment of my invention, I am aware that many minor changes therein will readily suggest themselves to others skilled in the art without departing from the spirit and scope of the invention. Having thus described my invention, what I claim as new and desire to protect by Letters Patent is:

A hose reinforcing and supporting means comprising in combination an inverted U-shaped frame made of a single strand of wire terminating at each of its ends in a single coil of the wire for engaging a hose, said frame being twisted intermediate its ends and formed into a hose-embracing ring of a single coil of the wire, the wire above said hose-embracing ring being twisted and formed into a suspending ring formed at right angles to said hose-embracing ring.

HOWARD F. A. SCHMADEKE.

References Cited in the file of this patent

UNITED STATES PATENTS

| Number | Name | Date |
|---|---|---|
| 659,669 | Haynes | Oct. 16, 1900 |
| 682,269 | Poe | Sept. 10, 1901 |
| 1,225,243 | Hawes | May 8, 1917 |
| 1,568,931 | Thomas | Jan. 5, 1926 |
| 1,803,529 | Hyatt | May 5, 1931 |